United States Patent
Patel et al.

(10) Patent No.: US 12,135,629 B2
(45) Date of Patent: Nov. 5, 2024

(54) WORKLOAD PLACEMENT BASED ON SPECIAL PURPOSE ACCELERATOR REQUIREMENTS AND PERFORMANCE METRICS

(71) Applicant: Dell Products L.P., Round Rock, TX (US)

(72) Inventors: Dharmesh M. Patel, Round Rock, TX (US); John Kelly, Mallow (IE)

(73) Assignee: Dell Products L.P., Round Rock, TX (US)

(*) Notice: Subject to any disclaimer, the term of this patent is extended or adjusted under 35 U.S.C. 154(b) by 363 days.

(21) Appl. No.: 17/360,130

(22) Filed: Jun. 28, 2021

(65) Prior Publication Data

US 2022/0413987 A1    Dec. 29, 2022

(51) Int. Cl.
*G06F 11/34* (2006.01)
*G06F 9/50* (2006.01)
*G06F 11/30* (2006.01)

(52) U.S. Cl.
CPC ........ *G06F 11/3433* (2013.01); *G06F 9/5044* (2013.01); *G06F 9/5083* (2013.01); *G06F 11/3006* (2013.01)

(58) Field of Classification Search
CPC .. G06F 11/3433; G06F 9/5044; G06F 9/5083; G06F 11/300622
See application file for complete search history.

(56) References Cited

U.S. PATENT DOCUMENTS

| | | | |
|---|---|---|---|
| 9,081,620 B1* | 7/2015 | Chaubal | G06F 11/3055 |
| 9,613,147 B2 | 4/2017 | Carlson | |
| 10,877,817 B1* | 12/2020 | Balle | G06F 9/54 |
| 2011/0072437 A1* | 3/2011 | Druyan | G06F 9/505 |
| | | | 718/104 |
| 2014/0006225 A1* | 1/2014 | Bowman | G06Q 10/087 |
| | | | 705/28 |
| 2017/0255240 A1* | 9/2017 | Matteson | G06F 9/5094 |
| 2018/0150298 A1* | 5/2018 | Balle | G06T 1/20 |
| 2018/0234459 A1* | 8/2018 | Kung | H04L 63/0263 |
| 2019/0065260 A1* | 2/2019 | Balle | H05K 7/18 |
| 2019/0065284 A1* | 2/2019 | Sardino | G06F 9/5027 |
| 2019/0347137 A1* | 11/2019 | Sivaraman | G06F 9/45558 |
| 2020/0252275 A1* | 8/2020 | Zhuo | G06F 12/06 |
| 2021/0073047 A1* | 3/2021 | Bhandaru | G06F 9/505 |
| 2021/0255902 A1* | 8/2021 | Soon-Shiong | G06F 9/5027 |
| 2022/0091829 A1* | 3/2022 | Silva | G06F 11/3409 |

* cited by examiner

*Primary Examiner* — Benjamin C Wu
(74) *Attorney, Agent, or Firm* — Chamberlain, Hrdlicka, White, Williams & Aughtry; Aly Dossa

(57) ABSTRACT

An infrastructure manager for placing workloads for performance across available infrastructure including on-demand infrastructure and dedicated infrastructure includes a storage device for storing an available infrastructure repository and a processor. The processor obtains a workload placement request for a workload of the workloads; makes a determination that the workload has a special purpose hardware requirement; in response to the determination: identifies, using the available infrastructure repository, potential placement locations in the available infrastructure for the workload that each meet the special purpose hardware requirement; and places the workload at one of the potential placement locations.

20 Claims, 16 Drawing Sheets

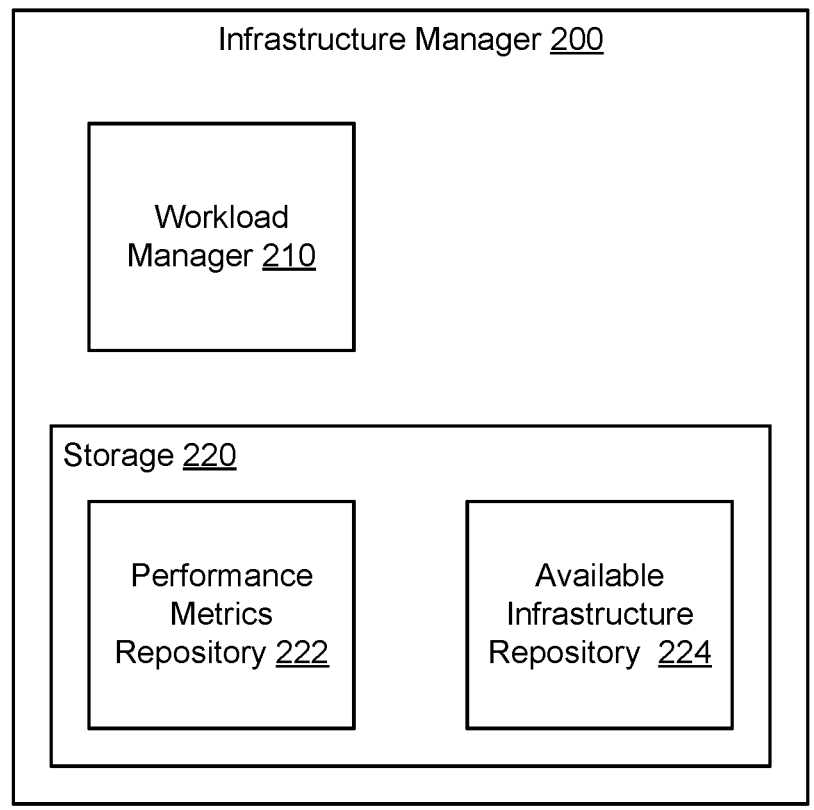
FIG. 2.1

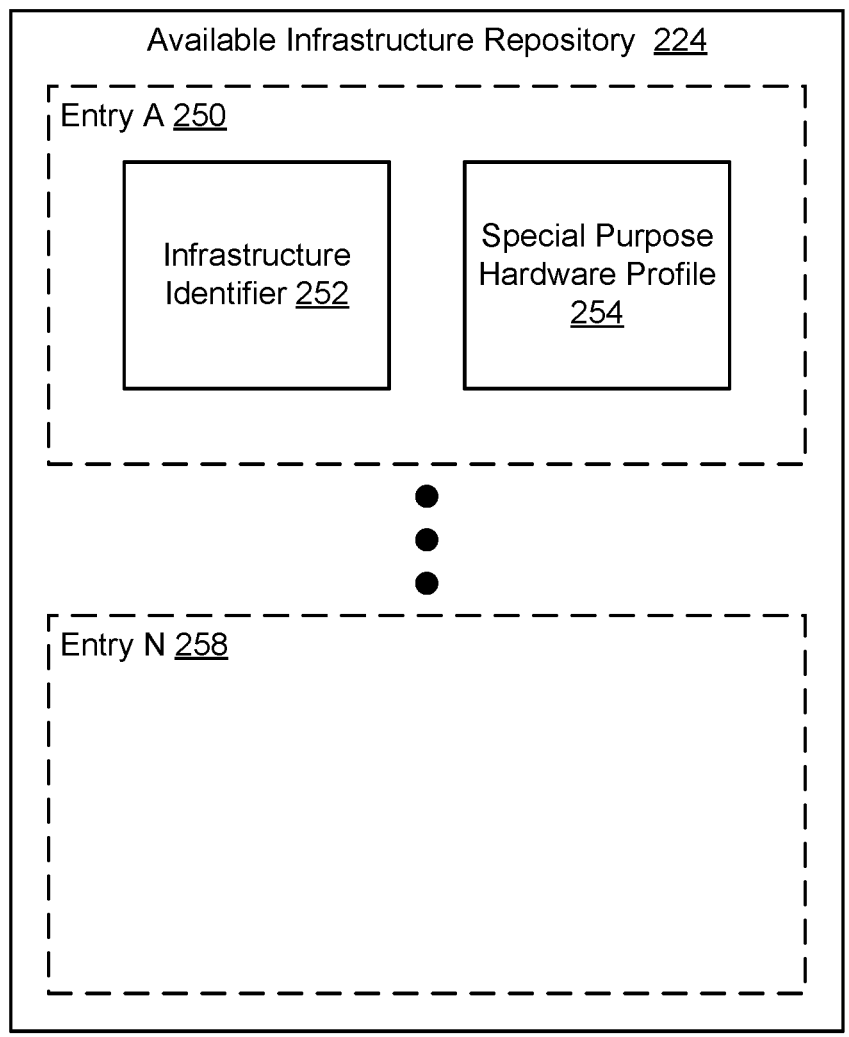
FIG. 2.2

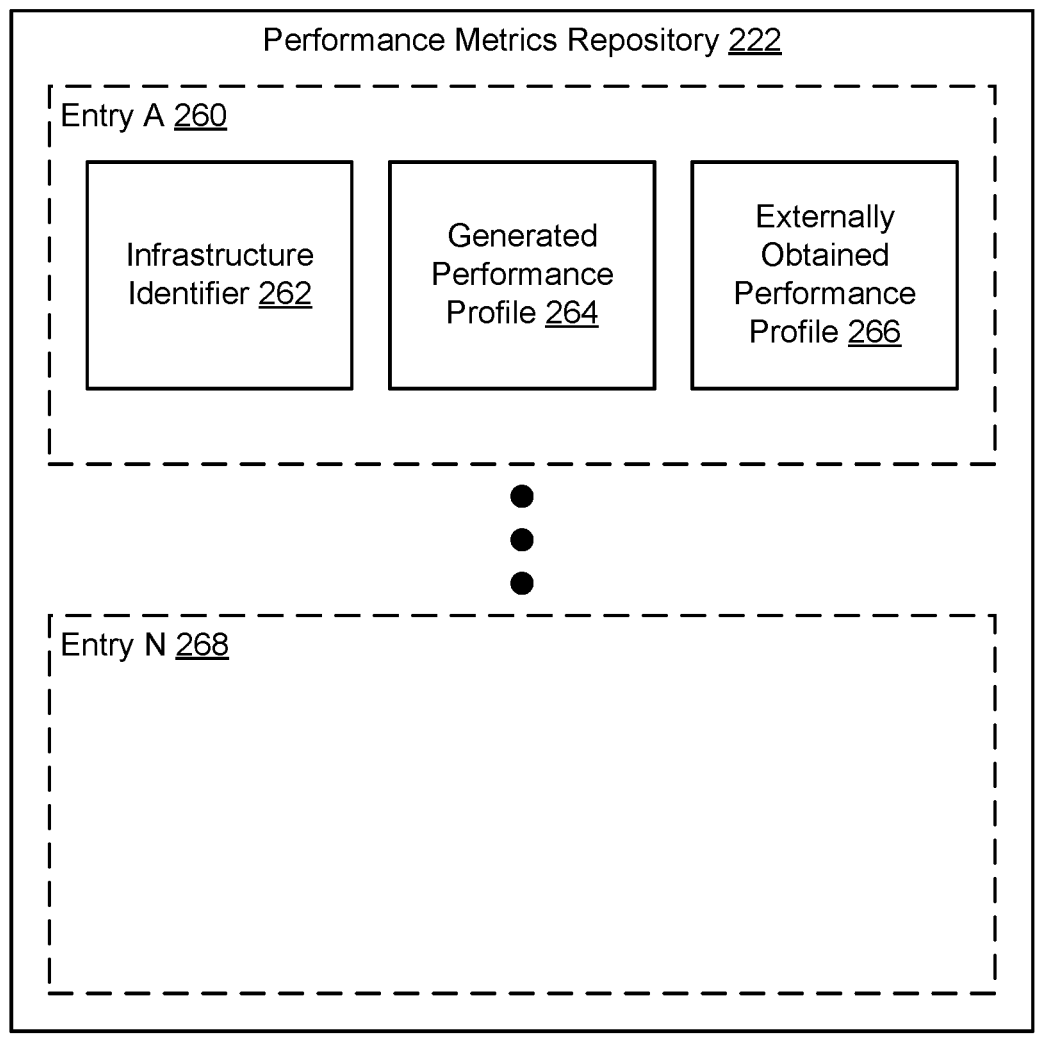
FIG. 2.3

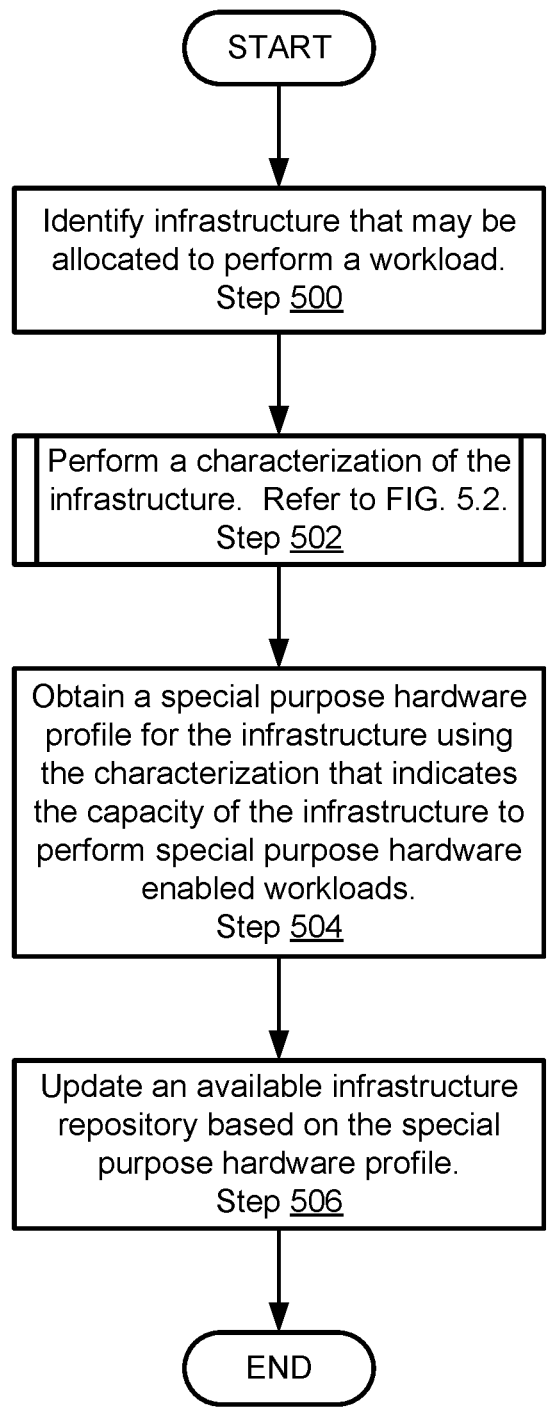
FIG. 5.1

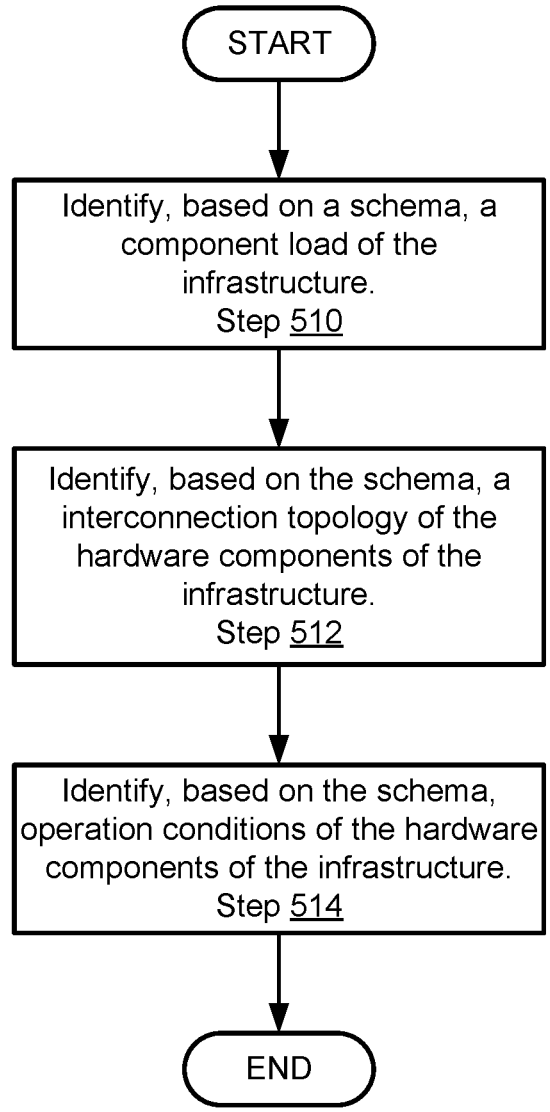
FIG. 5.2

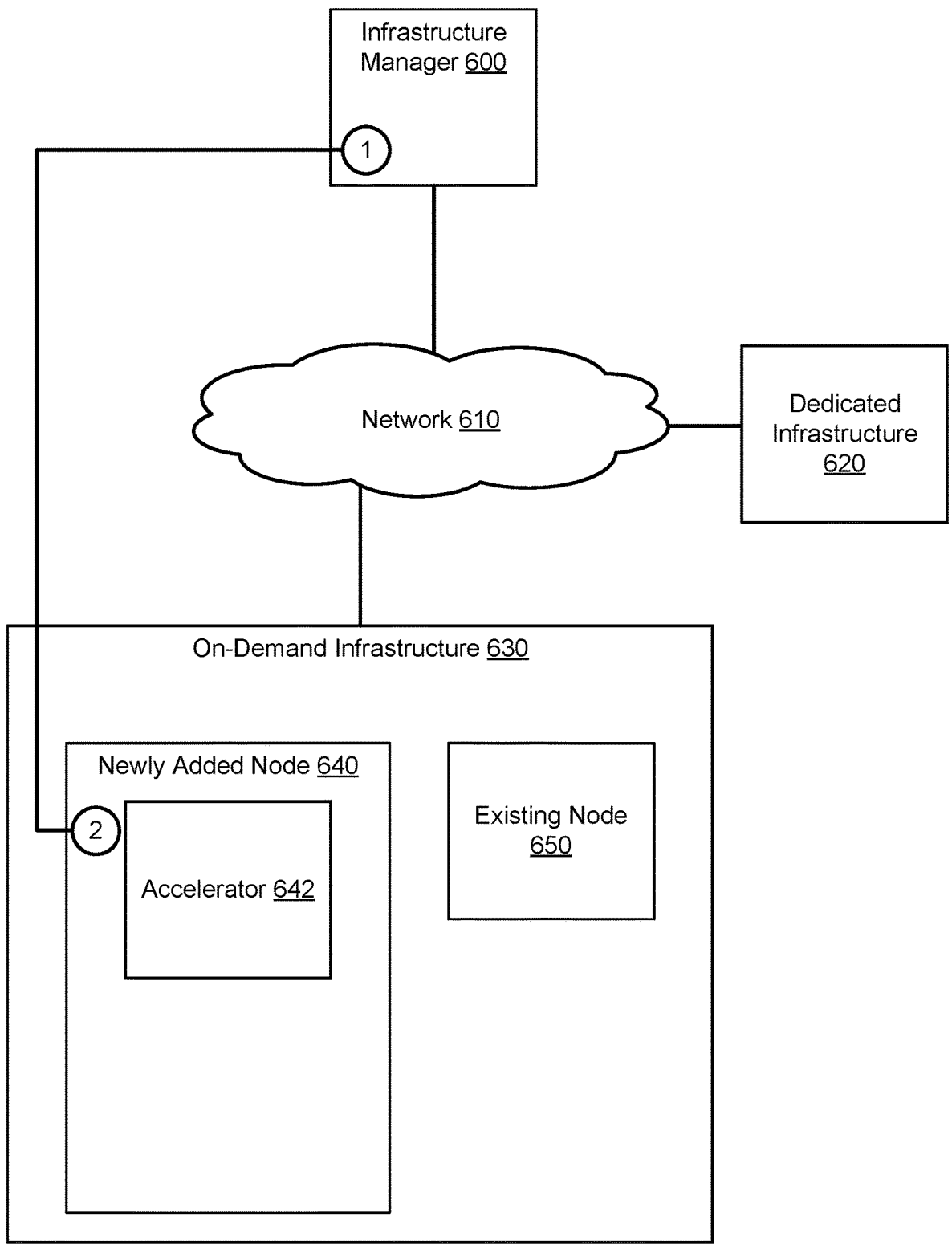
FIG. 6.1

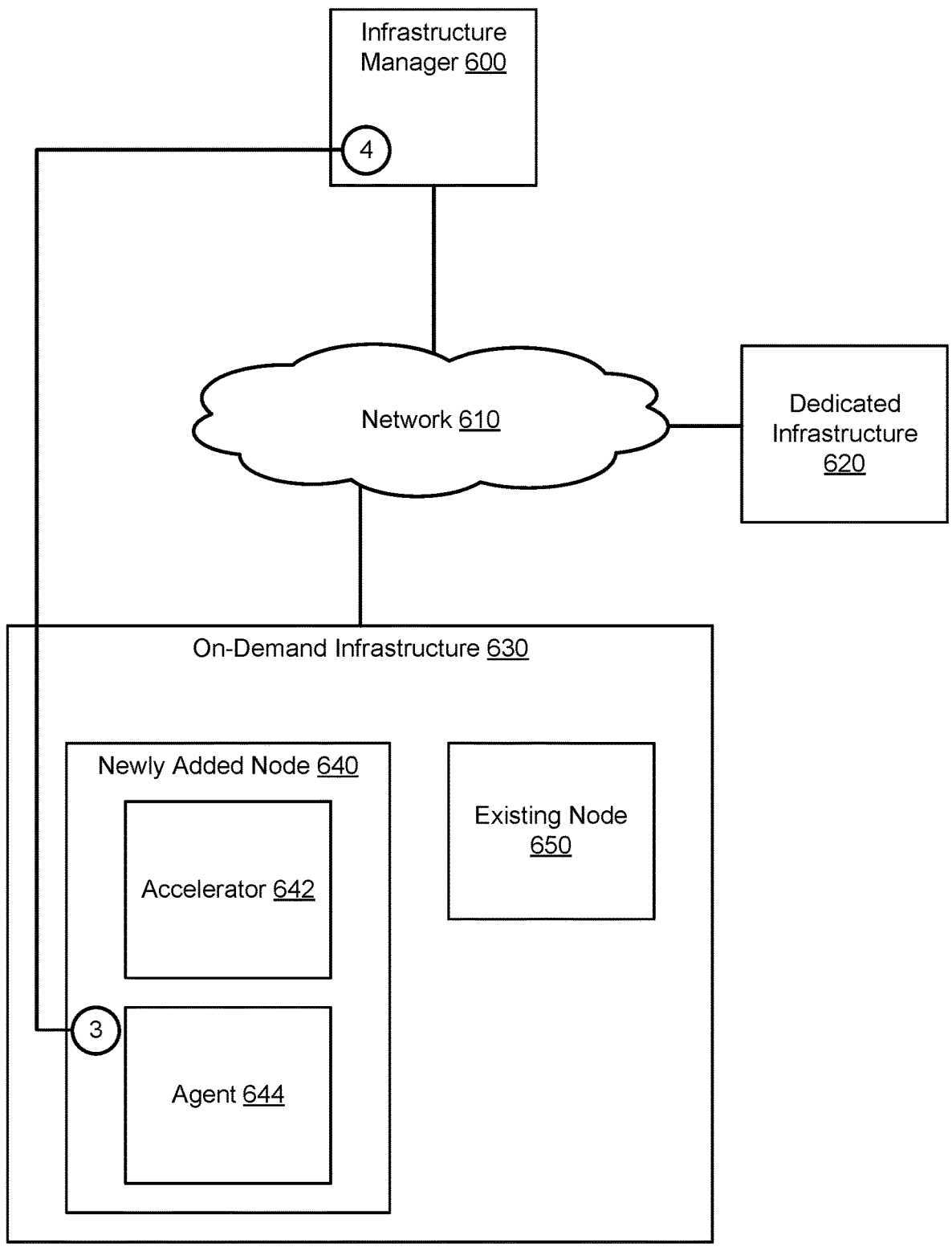
FIG. 6.2

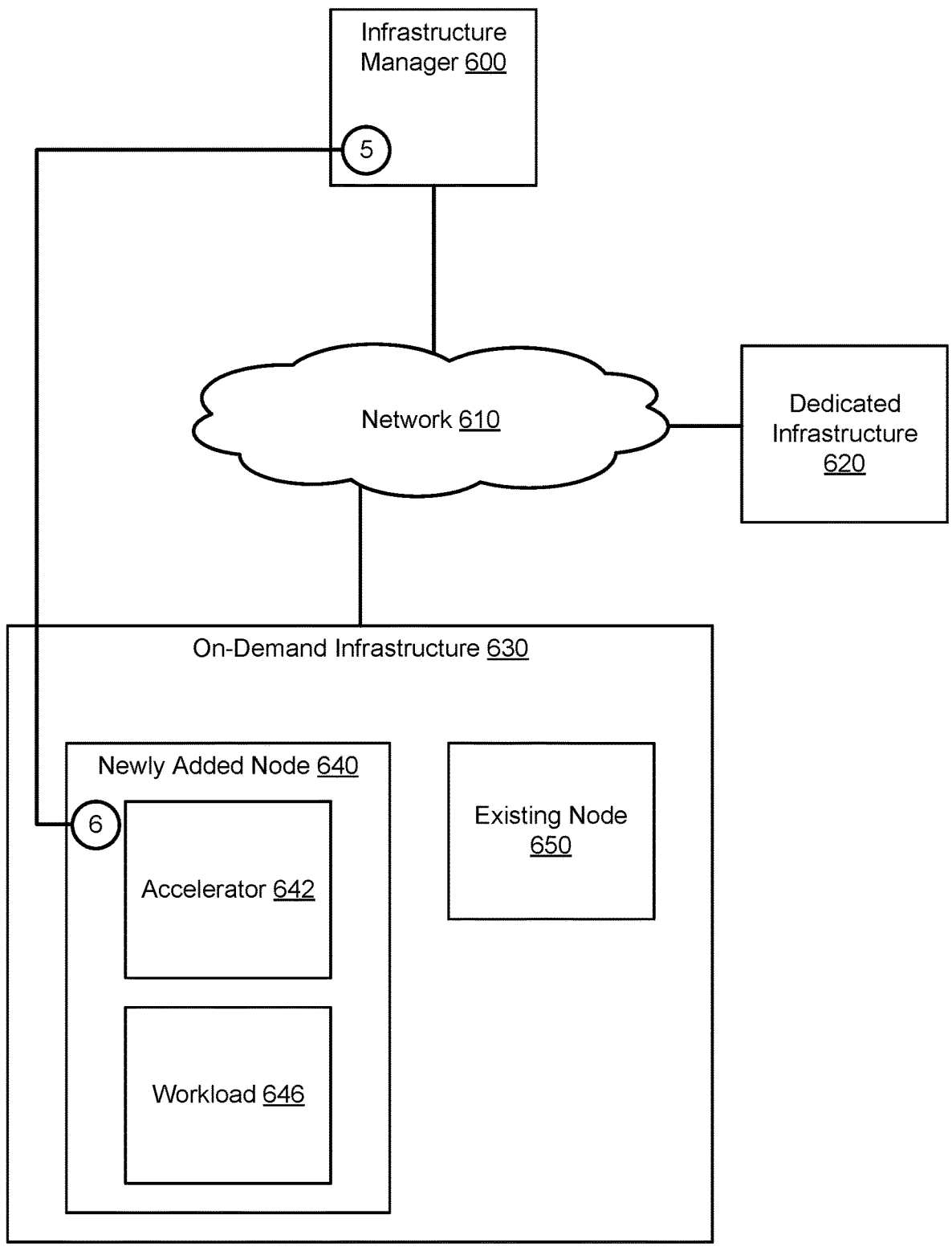
FIG. 6.3

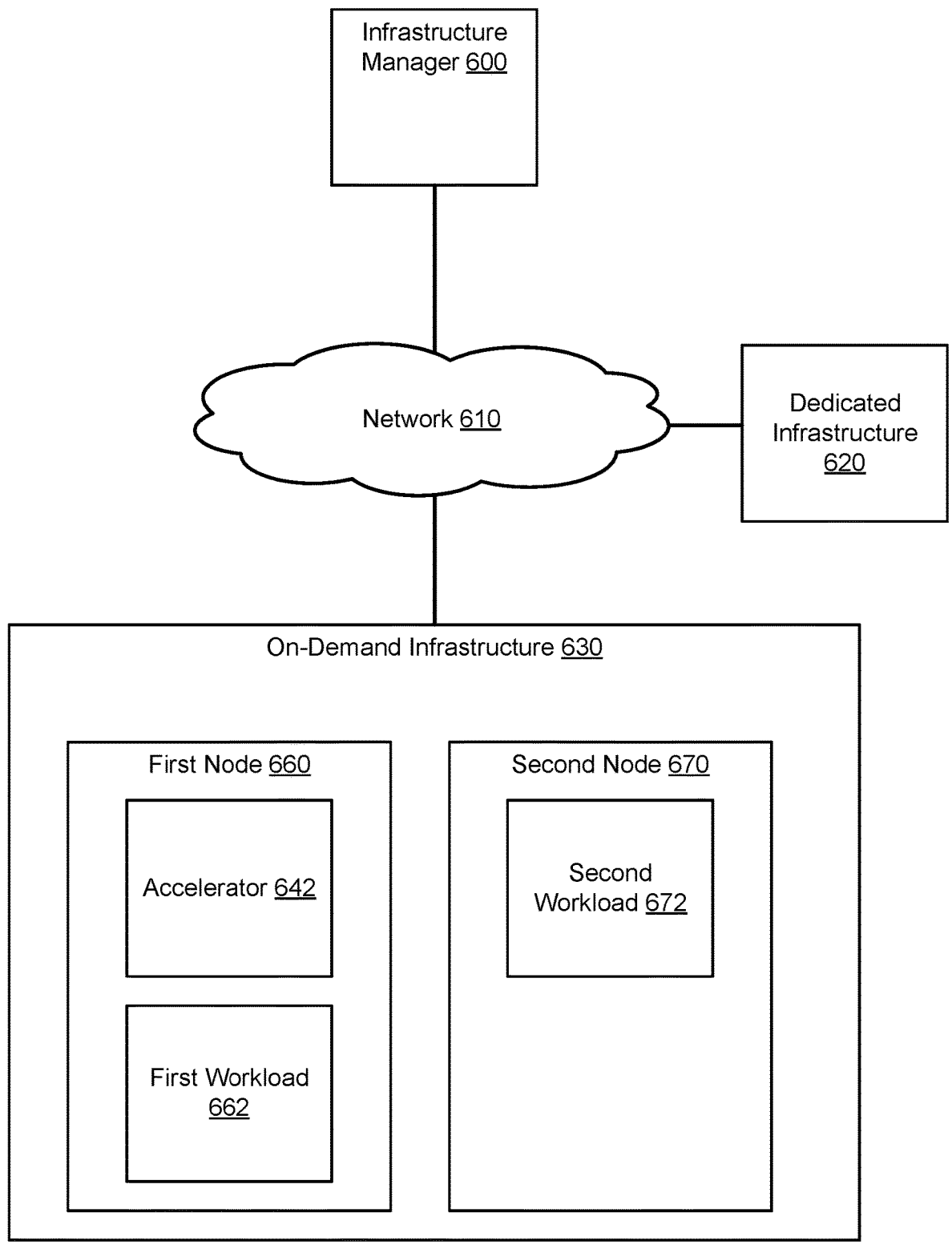
FIG. 7.1

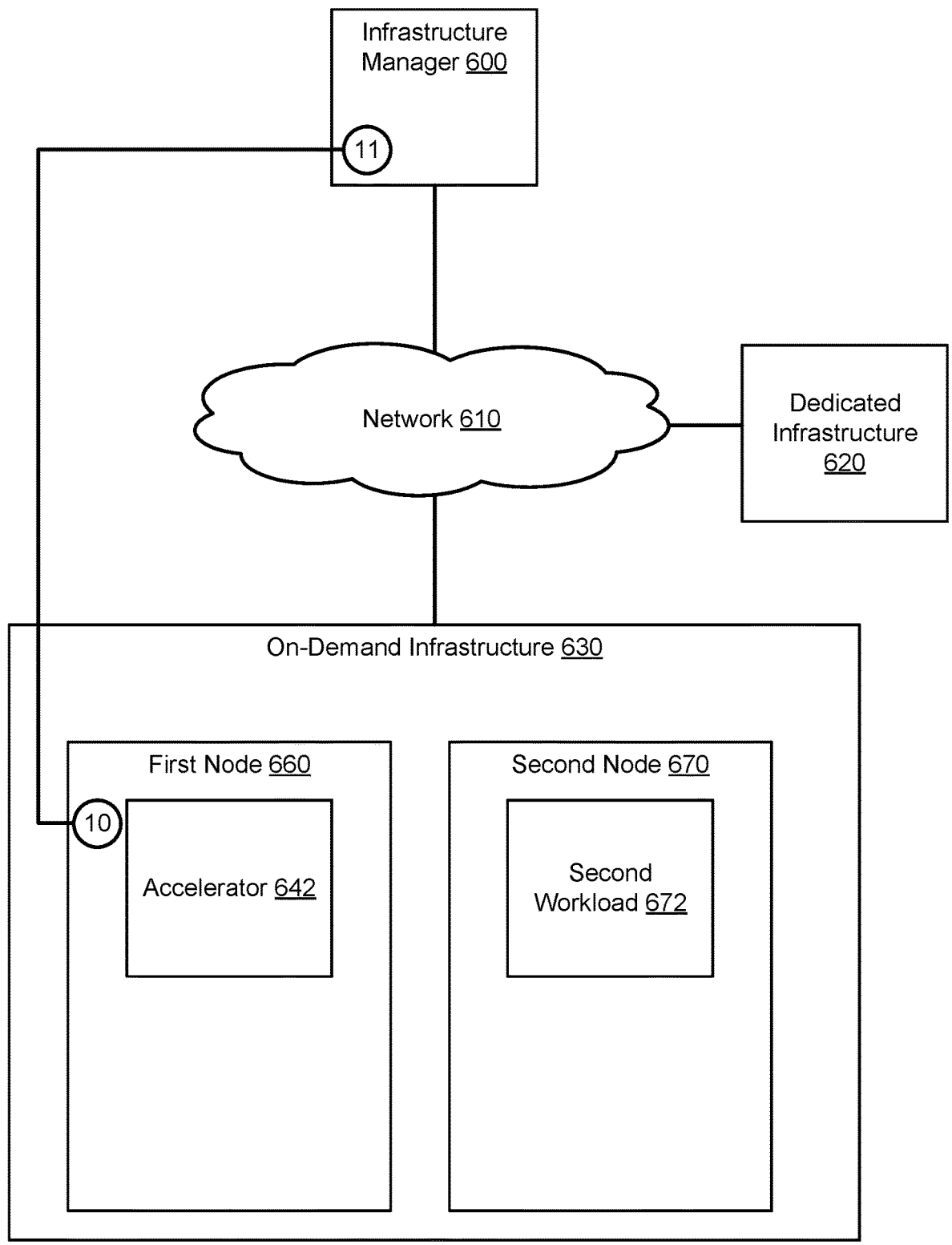
FIG. 7.2

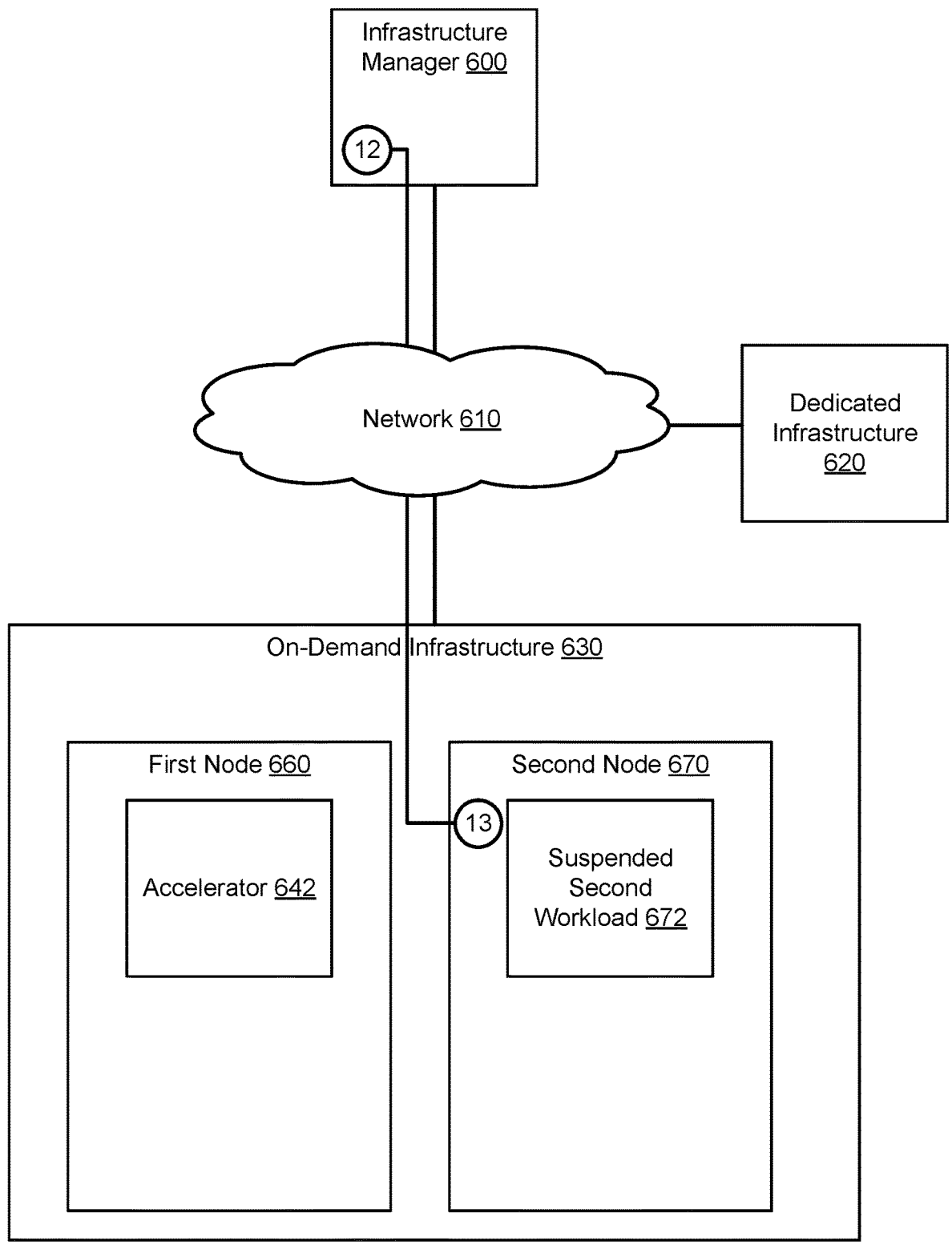
FIG. 7.3

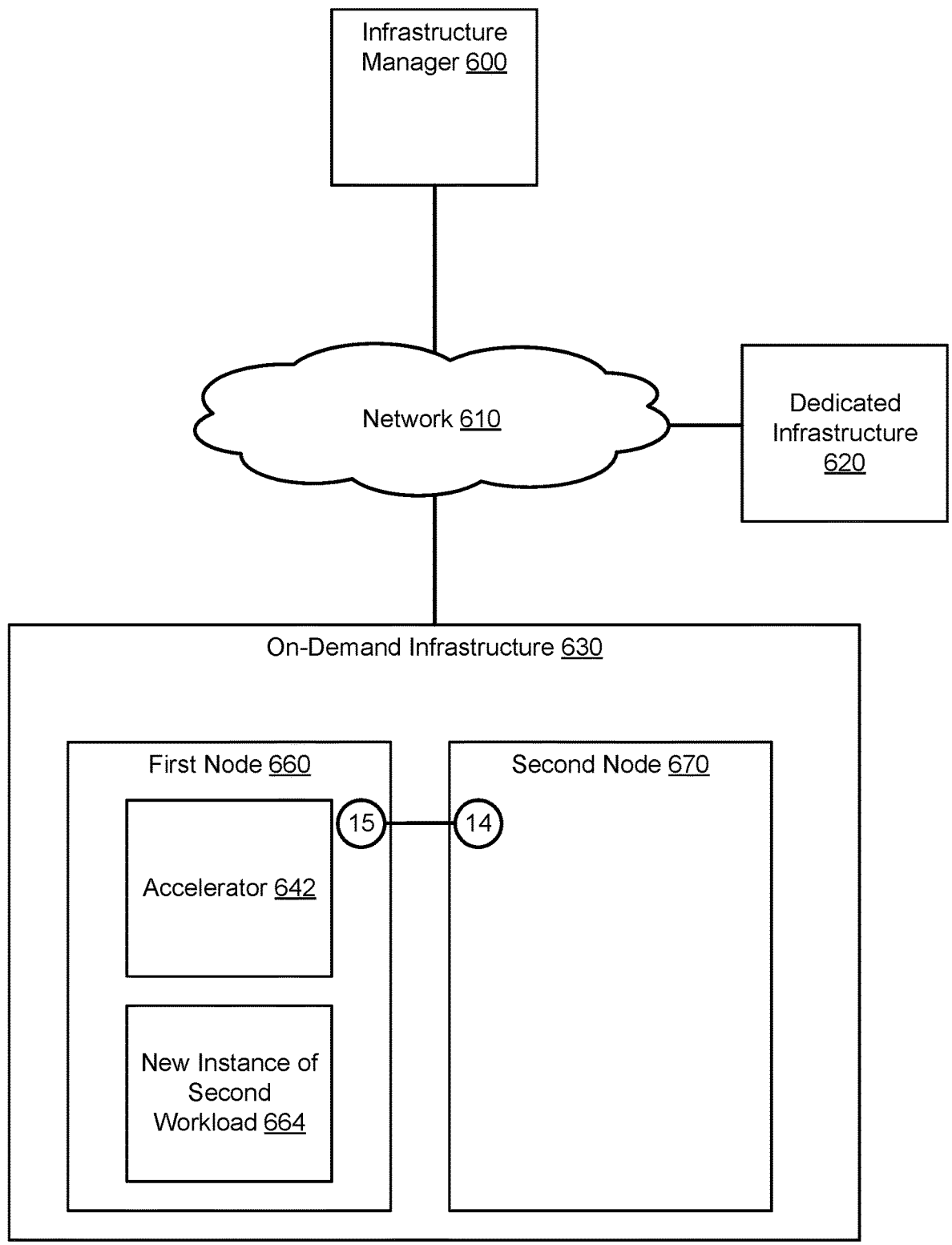
FIG. 7.4

WORKLOAD PLACEMENT BASED ON SPECIAL PURPOSE ACCELERATOR REQUIREMENTS AND PERFORMANCE METRICS

BACKGROUND

Computing devices may provide services. To provide the services, the computing devices may include hardware components and software components. The software components may store information usable to provide the services using the hardware components.

SUMMARY

In one aspect, an infrastructure manager for placing workloads for performance across available infrastructure in including on-demand infrastructure and dedicated infrastructure in accordance with one or more embodiments of the invention includes a storage device for storing an available infrastructure repository and a processor. The processor obtains a workload placement request for a workload of the workloads; makes a determination that the workload has a special purpose hardware requirement; in response to the determination: identifies, using the available infrastructure repository, potential placement locations in the available infrastructure for the workload that each meet the special purpose hardware requirement; and places the workload at one of the potential placement locations.

In one aspect, a method for placing workloads for placing workloads for performance across available infrastructure in accordance with one or more embodiments of the invention including on-demand infrastructure and dedicated infrastructure. The method includes obtaining a workload placement request for a workload of the workloads; making a determination that the workload has a special purpose hardware requirement; in response to the determination: identifying, using the available infrastructure repository, potential placement locations in the available infrastructure for the workload that each meet the special purpose hardware requirement; and placing the workload at one of the potential placement locations.

In one aspect, a non-transitory computer readable medium in accordance with one or more embodiments of the invention includes computer readable program code, which when executed by a computer processor enables the computer processor to perform a method for placing workloads for performance across available infrastructure including on-demand infrastructure and dedicated infrastructure. The method includes on-demand infrastructure and dedicated infrastructure. The method includes obtaining a workload placement request for a workload of the workloads; making a determination that the workload has a special purpose hardware requirement; in response to the determination: identifying, using the available infrastructure repository, potential placement locations in the available infrastructure for the workload that each meet the special purpose hardware requirement; and placing the workload at one of the potential placement locations.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an infrastructure manager in accordance with one or more embodiments of the invention.

FIG. 2.2 shows a diagram of an available infrastructure repository in accordance with one or more embodiments of the invention.

FIG. 2.3 shows a diagram of a performance metrics repository in accordance with one or more embodiments of the invention.

FIG. 5.1 shows a flowchart of a method of managing an available infrastructure repository in accordance with one or more embodiments of the invention.

FIG. 5.2 shows a flowchart of a method of characterizing infrastructure in accordance with one or more embodiments of the invention.

FIGS. 6.1-7.4 shows diagrams of the operation of a system similar to that of FIG. 1 over time in accordance with one or more embodiments of the invention.

DETAILED DESCRIPTION

Figure 1:
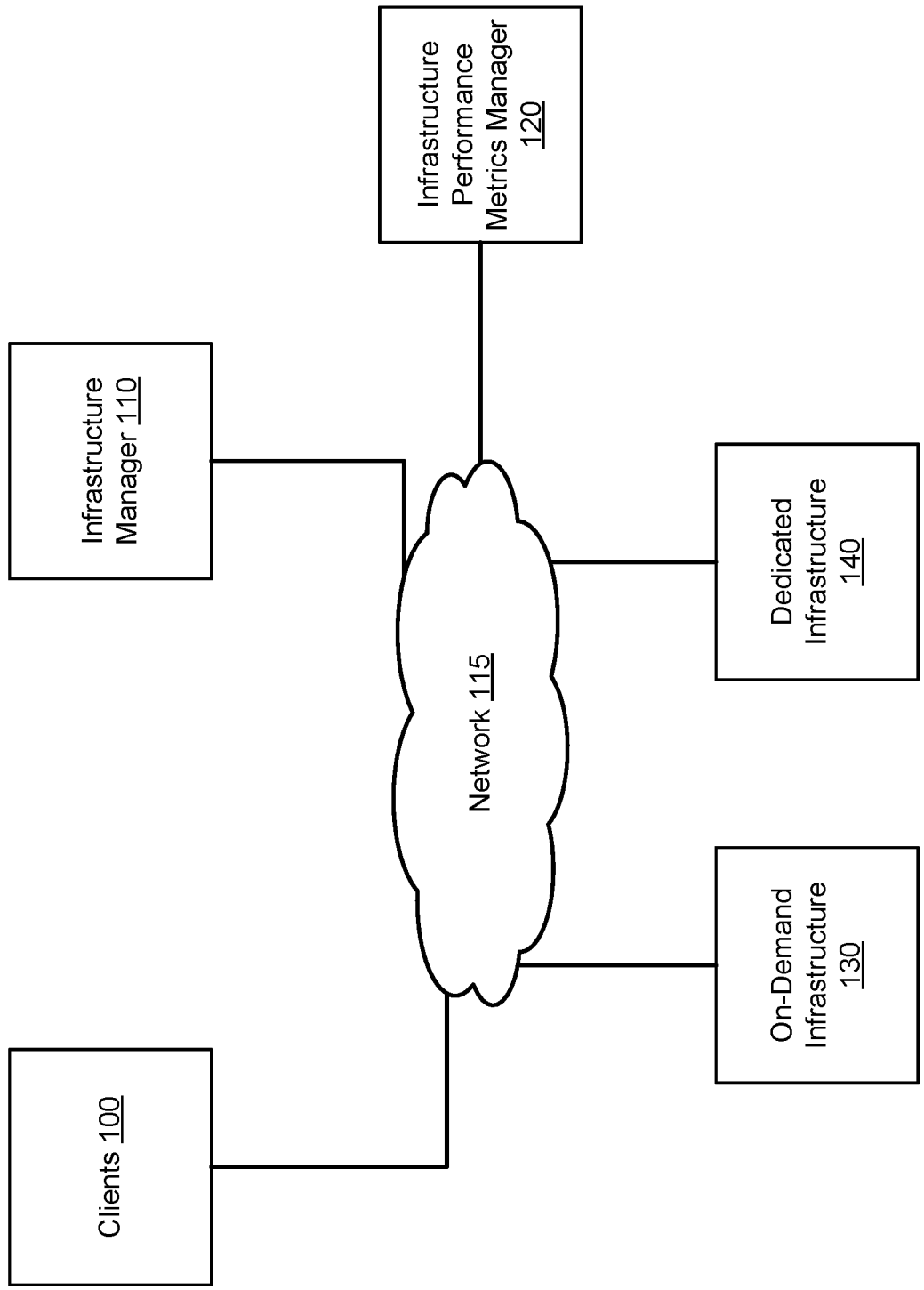
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments of the invention relate to systems, devices, and methods for managing the performance of workloads. The workloads may include any number and type of workloads. The workloads may be performed for any purpose.

To perform the workloads, the system may utilize a hybrid public-private computing environment that includes dedicated infrastructure (e.g., a computing environment for performing workloads for an entity/owner) and on-demand infrastructure (e.g., public clouds or other types of computing environments that may be dynamically allocated for performing workloads) (the on-demand infrastructure and the dedicated infrastructure being the infrastructure as used herein). Various portions of the infrastructure may include different types of hardware devices (e.g., processors, memory modules, storage devices, communications devices, special purpose hardware devices, etc.). Further, over time, the available infrastructure may change in that portions of it may become inaccessible, its constituent hardware devices may change, software managing its operation may change, etc. Consequently, the ability of any portion of the infrastructure to efficiently perform a workload may change (e.g., may become more or less able) over time.

To manage the placement of workloads for efficient performance, the system may include an infrastructure manager. The infrastructure manager may monitor the availability of infrastructure for performance of workloads, characterize the capacity of the infrastructure to perform different types of workloads, place workloads for performance, and dynamically migrate placed workloads between placement locations as the infrastructure that may perform the workloads changes over time.

To monitor the availability of infrastructure for performance of workloads, the infrastructure manager may granularly characterize the computational capabilities of the infrastructure. Specifically, the infrastructure manager may identify whether different portions of infrastructure host special purpose hardware devices that may greatly improve the efficiency of performing certain types of workloads.

To characterize the capacity of the infrastructure to perform different types of workloads, the infrastructure manager may utilize both internally developed performance metrics (e.g., by performing test workloads) that are validated and externally developed performance metrics (e.g., benchmarks or other unvalidated external testing). The infrastructure manager may utilize these metrics to predict how efficiently workloads will be performed at different placement locations within the infrastructure.

Once a workload is placed, the infrastructure manager may monitor the operation of the infrastructure to identify performance metric change events. A performance metric change event may be the occurrence of an event that may make a previously made workload placement less desirable (e.g., due to the new availability of placement location that may more efficiently perform the workload). If the infrastructure manager determines that a superior placement location for an on-going workload is available, the infrastructure manager may migrate the workload to the superior placement location.

By managing workloads as discussed above, a system in accordance with embodiments of the invention may more efficiently marshal limited computing resources for the performance of workloads. Consequently, a system in accordance with embodiments of the invention may perform workloads more efficiently, more quickly, and/or may better enable workloads to be completed within desired periods of time.

Turning to FIG. 1, FIG. 1 shows a system in accordance with one or more embodiments of the invention. The system may include any number of clients (100). The clients (100) may provide computer implemented services to users of the clients (100) (and/or other devices such as, other clients or other types of devices). The clients (100) may provide any number and type of computer implemented services (e.g., data storage services, electronic communication services, etc.).

To provide computer implemented services, the entities hosted by the clients (e.g., applications) may utilize various available infrastructure that may perform workloads. For example, the clients (100) may utilize the infrastructure to perform workloads that they may, in turn, use to provide their own computer implemented services. The workloads performed by the infrastructure may include any type and quantity of workloads.

The infrastructure may include, for example, on-demand infrastructure (130) and/or dedicated infrastructure (140). The on-demand infrastructure (130) may be used by different entities over time, may be shared between multiple entities (e.g., various clients), and/or may otherwise not be dedicated for use by a particular client, owner, entity, etc. For example, the on-demand infrastructure (130) may be implemented using a cloud resource or other computing environment which may be dynamically allocated for use by any number of entities.

In contrast, the dedicated infrastructure (140) may be dedicated for use by a particular client, owner, entity, etc. By virtue of its dedicated nature, the dedicated infrastructure may have a fixed cost (e.g., ownership cost) while the on-demand infrastructure (130) may have a cost that is based on use (e.g., lease/use based cost).

The infrastructure (e.g., on-demand infrastructure and dedicated infrastructure) may include resources that change over time (e.g., hardware components may be added or removed, different software management layers may be implemented, etc.) and may also service different types of workloads overtime. Consequently, the infrastructure's ability to service different types of workloads over time may change.

Additionally, by virtue of the addition, removal, and/or modification of special purpose hardware devices (e.g., accelerators, graphics processors, special purpose integrated circuits, etc.) hosted by various portions of the infrastructure, various portions of the infrastructure may be better able to (e.g., may more efficiently) service particular types of workloads. For example, some workloads may be performed very efficiently using accelerators rather than general purpose computing devices (e.g., general purpose processors). In contrast, the lack of such accelerators may greatly hinder various portions of the infrastructure from efficiently performing certain types of workloads.

In general, embodiments of the invention relate to systems, devices, and methods for servicing workloads using infrastructure. To service workloads, the system of FIG. 1 may place the workloads in the infrastructure, execute the placed workloads, and provide the results of the workloads to various entities (e.g., clients and/or other types of entities that desire to have access to the results of the workloads). However, depending on where a workload is placed within the infrastructure, the workloads may be performed efficiently or inefficiently.

For example, if a workload that may be performed efficiently using an accelerator enabled computing resource is placed for performance in a computing resource that does not have an accelerator, then the workload may be performed less efficiently (e.g., may take more time and/or power to perform the workload). In contrast, placing the workload in the accelerator enabled computing resource for performance may cause the workload to be performed efficiently.

In another example, if a workload is computation limited (versus storage limited, communication bandwidth limited, etc.), then placing the workload in a computing resource that has ample available computing resources may cause the workload to be completed efficiently.

To improve the efficiency of workload performance, the system of FIG. 1 may include an infrastructure manager (110). The infrastructure manager (110) may select where to place workloads for performance. Additionally, the infrastructure manager (110) may monitor the condition of the infrastructure and, if warranted (e.g., in response to a performance metric change event, discussed below), may transition workloads to different locations within the infrastructure. For additional details regarding the infrastructure manager (110), refer to FIG. 2.1.

To determine where to place and/or migrate workloads, the infrastructure manager (110) may obtain information regarding various types of workloads. The information may include performance metrics related to how workloads will likely be performed by various portions of the infrastructure.

The information may be obtained from any number of sources including an infrastructure performance metrics manager (120). The infrastructure performance metrics manager (120) may aggregate information usable to estimate how different placements of workloads will impact performance of the workloads.

The information may include, for example, results of tests (e.g., causing a portion of infrastructure to perform a test workload that may be similar to workloads that may be placed/migrated), information from other sources (e.g., results of testing of workloads on various types of infrastructure), and/or other types of information. The infrastructure performance metrics manager (120) may provide information to the infrastructure manager (110) for workload placement/migration purposes.

The system of FIG. 1 may include any number of clients (100), infrastructure managers (e.g., 110), infrastructure performance metrics managers (e.g., 120), on-demand infrastructure (130), and dedicated infrastructure (140). Any of the components of FIG. 1 may be operably connected to any other component and/or other components not illustrated in FIG. 1 via one or more networks (e.g., 115). The networks (e.g., 115) may be implemented using any combination of wired and/or wireless network topologies. The networks may employ any number and types of communication schemes to enable the clients (100), infrastructure manager (110), infrastructure performance metrics manager (120), on-demand infrastructure (130), and dedicated infrastructure (140) to communicate with each other.

The clients (100), infrastructure managers (e.g., 110), infrastructure performance metrics managers (e.g., 120), on-demand infrastructure (130), and dedicated infrastructure (140) may be implemented using computing devices. The computing devices may include, for example, a server, laptop computer, a desktop computer, a node of a distributed system, etc. (e.g., one or more being part of an information handling system). The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100), infrastructure managers (e.g., 110), infrastructure performance metrics managers (e.g., 120), on-demand infrastructure (130), and dedicated infrastructure (140) described in this application and/or all, or a portion, of the method illustrated in FIG. 4. The clients (100), infrastructure manager (110), infrastructure performance metrics manager (120), on-demand infrastructure (130), and dedicated infrastructure (140) may be implemented using other types of computing devices without departing from the invention. For additional details regarding computing devices, refer to FIG. 6.

While the system of FIG. 1 has been illustrated and described as including a limited number of specific components, a system in accordance with embodiments of the invention may include additional, fewer, and/or different components without departing from the invention.

Turning to FIG. 2.1, FIG. 2.1 shows a diagram of an infrastructure manager (200) in accordance with one or more embodiments of the invention. The system of FIG. 1 may include any number of infrastructure managers (e.g., 110) similar to the infrastructure manager (200) illustrated in FIG. 2. The infrastructure manager (200) may provide workload management services for any number of workloads being performed by the system illustrated in FIG. 1.

To provide workload management services, the infrastructure manager (200) may include a workload manager (210) and storage (220). Each of these components is discussed below.

The workload manager (210) may manage the performance of workloads. To do so, the workload manager (210) may (i) obtain information regarding infrastructure that may be used to perform workloads (and/or store such information in an available infrastructure repository (224)), (ii) obtain information usable to estimate how well workload will be performed by different portions of infrastructure (and/or store such information in a performance metrics repository (222)), (iii) obtain workload performance requests for any number and type of workloads, (iv) place the workloads in infrastructure for performance, (v) while performing the workloads, monitor the infrastructure (e.g., regarding the addition/removal of functionality of the infrastructure), and (vi) migrate the workloads to different infrastructure if warranted based on the monitoring of the infrastructure. By doing so, the limited resources of the infrastructure may be efficiently marshalled to perform the workloads across a range of different types (e.g., on-demand versus dedicated) of infrastructure.

Figure 3:
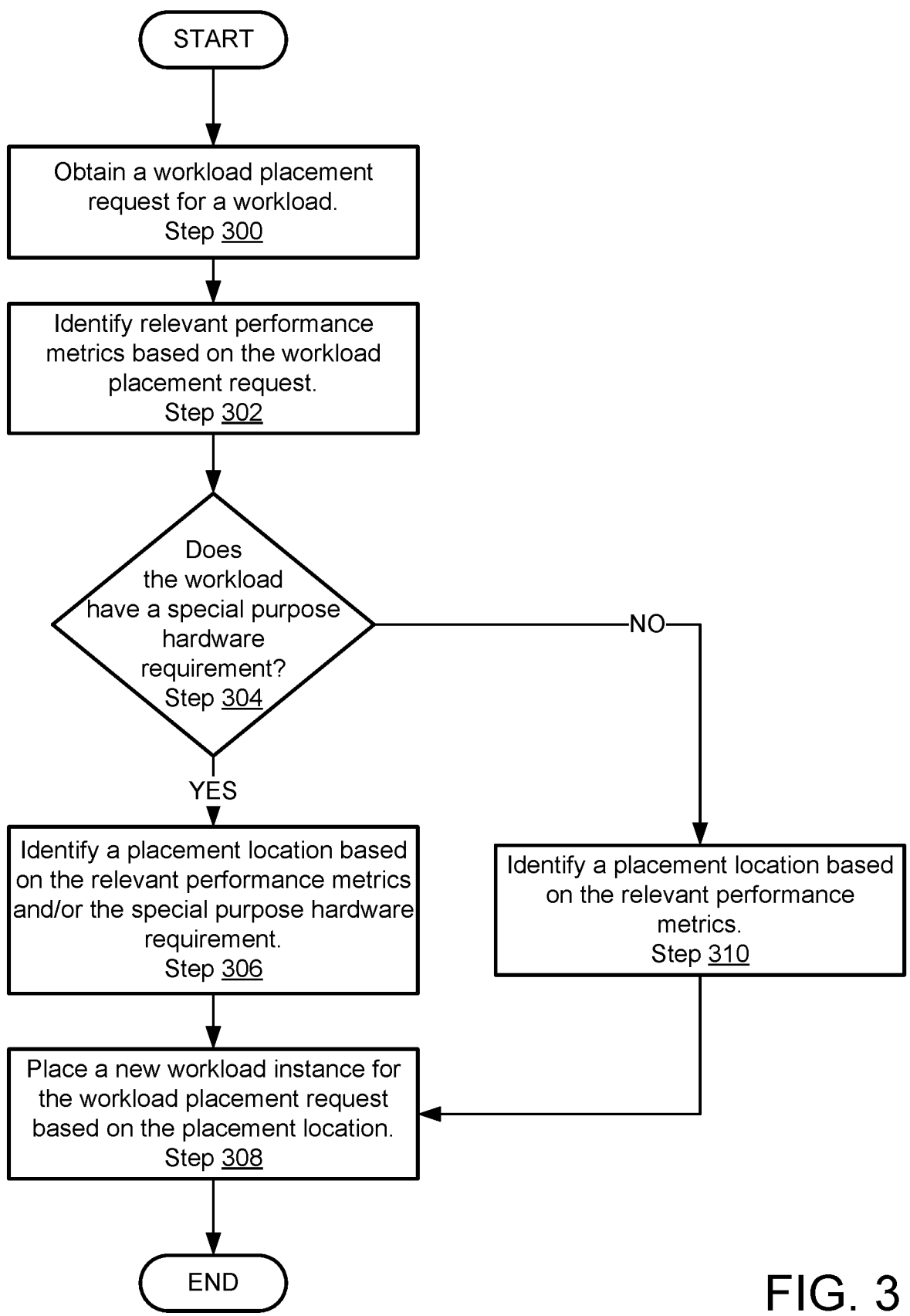
FIG. 3 shows a flowchart of a method of placing workloads in accordance with one or more embodiments of the invention.
Figure 4:
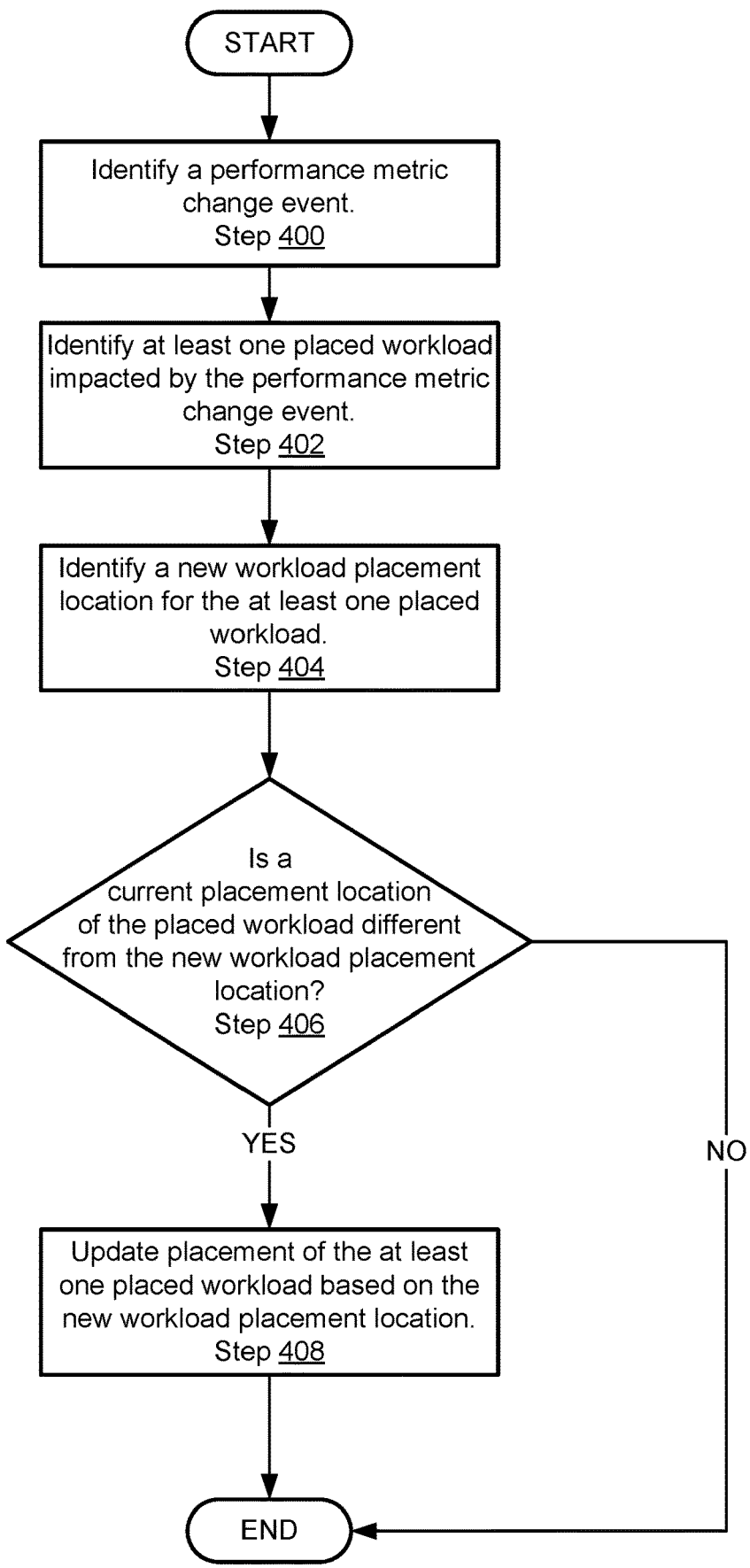
FIG. 4 shows a flowchart of a method of responding to performance metric change events in accordance with one or more embodiments of the invention.

When providing its functionality, the workload manager (210) may perform all, or a portion, of the methods illustrated in FIGS. 3-5.2.

In one or more embodiments of the invention, the workload manager (210) is implemented using a hardware device including circuitry. The hardware device may be, for example, a digital signal processor, a field programmable gate array, or an application specific integrated circuit. The circuitry may be adapted to cause the hardware device to perform the functionality of the workload manager (210). The workload manager (210) may be implemented using other types of hardware devices without departing from the invention.

In one or more embodiments of the invention, the workload manager (210) is implemented using a processor adapted to execute computing code stored on a persistent storage that when executed by the processor performs the functionality of the workload manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, a performance metrics repository (222) and an available infrastructure repository (224). Each of these data structures is discussed below.

The performance metrics repository (222) may be implemented using one or more data structures that includes information that may be used to estimate the likely performance of workloads using different portions of infrastructure. The information may include, for example, the results of testing of dedicated infrastructure (e.g., performance of test workloads using the dedicated infrastructure), the results of testing of on-demand infrastructure (e.g., performance of test workloads using the on-demand infrastructure), and/or information obtained from other sources (e.g., industry standard testing bodies such as publicly available workload performance information). For additional information regarding the content of the performance metrics repository (222), refer to FIG. 2.3.

The workload manager (210) may use the information included in the performance metrics repository (222) to determine where to place workloads and/or whether to migrate workloads. For example, the workload manager (210) may use the information to identify the likely performance of workloads in different infrastructure locations (e.g., tasking some number of computing devices of the infrastructure to perform a workload), whether a change in a portion of infrastructure indicates that a workload should be migrated to another location, etc. By doing so, the workload manager (210) may better marshal limited resources for the performance of workloads.

The performance metrics repository (222) may be maintained by, for example, the workload manager (210). For example, the workload manager (210) may add, remove, and/or modify information included in the performance metrics repository (222). The workload manager (210) may do so based on information obtained from agents hosted by the service devices.

The data structures of the performance metrics repository (222) may be implemented using, for example, lists, tables, unstructured data, databases, etc. While illustrated in FIG. 2.1 as being stored locally, the performance metrics repository (222) may be stored remotely and may be distributed across any number of devices without departing from the invention.

The available infrastructure repository (224) may be implemented using one or more data structures that includes information regarding the infrastructure in which workloads may be placed. For example, the available infrastructure repository (224) may specify the types, quantities, and/or characteristics of different portions of infrastructure in which workloads may be placed. For additional information regarding the content of the available infrastructure repository (224), refer to FIG. 2.2.

The available infrastructure repository (224) may be maintained by, for example, the workload manager (210). For example, the workload manager (210) may add, remove, and/or modify information included in the available infrastructure repository (224).

The data structures of the available infrastructure repository (224) may be implemented using, for example, lists, tables, unstructured data, databases, etc. While illustrated in FIG. 2.1 as being stored locally, the available infrastructure repository (224) may be stored remotely and may be distributed across any number of devices without departing from the invention.

While the storage (220) has been illustrated and described as including a limited number and type of data, a storage in accordance with embodiments of the invention may store additional, less, and/or different data without departing from the invention.

While the infrastructure manager (200) has been illustrated and described as including a limited number of specific components, an infrastructure manager in accordance with embodiments of the invention may include additional, fewer, and/or different components without departing from the invention.

To further clarify the content of the repositories described with respect to FIG. 2.1, diagrams of these repositories are illustrated in FIGS. 2.2 and 2.3, respectively.

Turning to FIG. 2.2, FIG. 2.2 shows a diagram of the available infrastructure repository (224) in accordance with one or more embodiments of the invention. The available infrastructure repository (224) may store information regarding various portions of infrastructure in which workloads may be placed.

The available infrastructure repository (224) may include any number of entries (e.g., 250, 258) associated with various portions of infrastructure. For example, each entry may include an infrastructure identifier (252) usable to identify a portion of infrastructure. The portion of infrastructure may be at any level of granularity (e.g., aggregation of nodes, individual nodes, portions of nodes such as hardware devices, etc.) without departing from the invention.

The infrastructure identifier (252) may be implemented using, for example, a name that identifies the infrastructure associated with the entity or any other type of identifier (e.g., a globally unique identified). The infrastructure identifier (252) may be usable to place workloads and/or obtain information usable to place the workload.

Each entry may also include a special purpose hardware profile (254) for the infrastructure associated with the entry. The special purpose hardware profile (254) may include information regarding (i) special purpose hardware devices such as accelerators, graphics processors, application specific integrated circuits, and/or other special purpose hardware devices, (ii) information regarding the interconnectivity between the special purpose hardware devices and/or general purpose computing devices, (iii) information regarding the version, firmware, and/or other characteristics that may govern the operation of the special purpose hardware devices (e.g., information that may indicate that the same special purpose hardware device may operate in a different manner from other special purpose hardware devices), and/or (iv) other information usable to ascertain whether a portion of infrastructure may be better suited to perform certain types of workloads based on the presence of special purpose devices.

For example, a special purpose hardware profile may specify a number of special purposes hardware devices hosted by a portion of infrastructure, a type of the special purpose hardware devices, an interconnection framework between the special purpose hardware devices and the portion of the infrastructure, firmware versions hosted by the special purpose hardware devices, revision versions of the special purpose hardware devices, etc. This information may be used by the workload manager to manage the placement and/or migration of workloads to portions of infrastructure that may be better suited to perform the workloads when compared to other portions of the infrastructure.

While the available infrastructure repository (224) has been described and illustrated as including specific information and structure in a specific manner, an available infrastructure repository in accordance with embodiments of the invention may include different information and may be structured differently from that illustrated in FIG. 2.2 without departing from the invention.

Turning to FIG. 2.3, FIG. 2.3 shows a diagram of the performance metrics repository (222) in accordance with one or more embodiments of the invention. The performance metrics repository (222) may store information usable to estimate how different placements of workloads may impact the performance of the workloads.

The performance metrics repository (222) may include any number of entries (e.g., 260, 268) associated with various portions of infrastructure. For example, each entry may include an infrastructure identifier (262) usable to identify a portion of infrastructure. The portion of infrastructure may be at any level of granularity (e.g., aggregation of nodes, individual nodes, portions of nodes such as hardware devices, etc.) without departing from the invention.

The infrastructure identifier (262) may be implemented using, for example, a name that identifies the infrastructure associated with the entry or any other type of identifier (e.g., a globally unique identified). The infrastructure identifier (262) may be usable to place workloads and/or obtain information usable to place the workload.

The entries may also include a generated performance profile (264) and/or an externally obtained performance profile (266). These profiles may include any type and quantity of information usable to estimate how a workload will be performed using the portion of infrastructure identified by the infrastructure identifier (262).

The generated performance profile (264) may include information generated or otherwise obtained by an owner of a workload that is to be placed. For example, the generated profile (264) may include (i) the results of performing a test workload (or other metric generating methodology) using the infrastructure identified by the infrastructure identifier (262), (ii) a description ascribed by an administrator to the infrastructure identified by the infrastructure identifier (262), and/or (iii) other information that may be usable to estimate the likely future performance of workloads using the infrastructure identified by the infrastructure identifier (262). The generated performance profile (264) may include any type and quantity of such information that has been validated, generated, and/or otherwise deemed by an owner of the workload to be accurate.

For example, to obtain the generated performance profile (264), an administrator may initiate performance of a number of different test workloads using the infrastructure identified by the infrastructure identifier (262). The performance of the test workloads may be monitored (e.g., identify the time required to perform, energy consumption, resource consumption, etc.) and results of the monitoring may be aggregated in the generated performance profile (264).

Due to limited available computing resources at a particular placement location identified by the infrastructure identifier (262), a workload may need to be scaled across multiple locations. In such a scenario, the infrastructure identifier (262) may identify multiple, distinct portions of infrastructure. When multiple, distinct portions of the infrastructure are identified, scale-out tests may be used to ascertain the reduction in performance scaling due to the distribution of a workload across the distinct portions of the infrastructure. The scale-out test may include any number and types of actions to be performed by the distinct portions of the infrastructure. The result of the scale-out test may be performance metrics that are usable to predict the distributed performance of workloads across multiple, distinct portion of infrastructure.

Like the generated performance profile (264), the externally obtained performance profile (266) may include information usable to estimate how a workload will likely be performed using the infrastructure identified by the infrastructure identifier. However, in contrast to the generated performance profile (264), the externally obtained performance profile (266) may not be generated, validated, and/or otherwise deemed to be accurate by the owner of a workload. The information included in the externally obtained performance profile (266) may be obtained from external sources. For example, the information included in the externally obtained performance profile (266) may include benchmarks (e.g., an external benchmark developed by a non-owner of to-be-placed workloads/owners of the infrastructure), results of computations performed by non-owners of workloads, etc. Any of the aforementioned information may be publicly available and/or private (e.g., from a subscription source).

The information included in the performance metrics repository (222) may change over time as new information is obtained. For example, when a workload is placed, the performance metrics repository (222) may include only a limited quantity of information. However, overtime this information may change which may indicate that a better placement for the workload is available. For example, overtime administrators of workloads, based on their experience administrating performance of workloads, may add additional information regarding the performance of various workloads to the generated performance profile (264).

The information included in each entry of the performance metrics repository (222) may be associated with any type and quantity of infrastructure. For example, an entry may be associated with one or more nodes of dedicated infrastructure and/or on-demand infrastructure (e.g., publicly available infrastructure).

While the performance metrics repository (222) has been described and illustrated as including specific information and structured in a specific manner, a performance metrics repository in accordance with embodiments of the invention may include different information and may be structured differently from that illustrated in FIG. 2.3 without departing from the invention.

As discussed above, the system of FIG. 1 may provide workload management services. FIGS. 3-5.2 illustrate methods that may be performed by components of the system of FIG. 1 to provide workload management services.

FIG. 3 shows a flowchart of a method in accordance with one or more embodiments of the invention. The method depicted in FIG. 3 may be performed to service a workload placement request in accordance with one or more embodiments of the invention. The method shown in FIG. 3 may be performed by, for example, an infrastructure manager (e.g., 110, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a workload placement request for a workload is obtained.

In one or more embodiments of the invention, the workload placement request is obtained from a client. The workload request may be obtained via a network communication (e.g., one or more packets or other communication protocol compliant data structure transmitted via a network).

The workload placement request may specify one or more of: (i) an identifier of a workload to be performed, (ii) a type of the workload to be performed, (iii) hardware resources necessary to perform the workload efficiently, (iv) prioritization criteria for performance of the workload, and/or (v) other information usable by the workload manager to ascertain how to place the workload for performance.

In one or more embodiments of the invention, the workload placement request is intercepted. For example, the clients (or other entities requesting performance of workloads using infrastructure) may be unaware of the existence of the workload manager. An orchestrator or other management entity that manages operation of the infrastructure usable to perform workloads may forward or otherwise provide workload placement requests to the workload manager. The workload manager may then take action to manage selection of where to place the workloads for performance (and/or migration of workloads during such performance).

In one or more embodiments of the invention, the workload placement request is directed to the workload manager. For example, the clients and/or other entities that may request performance of workloads may be aware of the existence of the workload manager.

In step 302, relevant performance metrics based on the workload placement request are identified. The relevant performance metrics may be usable to estimate how different placements of workloads will impact performance of the workloads.

In one or more embodiments of the invention, the relevant performance metrics are identified by matching a type of the workload (e.g., specified by the workload placement request and/or inferred based on the workload placement request) to profiles included in the performance metrics repository (222, FIG. 2.3). Different portions of the generated performance profile (264, FIG. 2.3) and/or externally obtained performance profile (266, FIG. 2.3) may be associated with different types of workloads. The matched portions may include the relevant performance metrics (e.g., data structures that include information usable to estimate the performance of the workload by the infrastructure associated with the matched entries).

The relevant performance metrics may be associated with any quantity of on-demand infrastructure and/or dedicated infrastructure. Consequently, different relevant performance metrics may be usable to estimate the performance of workloads using various combinations of both on-demand and/or dedicated infrastructure.

In the event that insufficient infrastructure meeting the hardware requirements of the workload is available, the relevant performance metrics may include scale-out metrics usable to estimate how distribution of the workload across infrastructure may impact performance of the workloads. The scale-out metrics may be included in the performance metrics repository and/or other locations.

For example, the scale-out metrics may indicate that, while a workload may be distributed across nodes that do not meet the hardware necessary for performance of the workload, the workload may be performed with reduced efficiency. The scale-out metrics may specify any type and quantity of information characterizing the reduced efficiency (e.g., increased computing resource consumption, larger duration of time for performance, etc.).

In step 304, it is determined whether the workload has a special purpose hardware requirement. A special purpose hardware requirement may be an improvement in performance of the workload when an accelerator, graphics processing unit, application specific integrated circuit, and/or other type of hardware device that is not generally available (e.g., in contrast to processors, memory, storage, etc.) is hosted by or otherwise usable by a portion of infrastructure to perform a workload.

For example, a special purpose hardware requirement may be that the presence of an accelerator (e.g., a hardware card or other form factor that that may perform a massively parallel or other method of processing data not generally available) may substantially improve the efficiency of performing a workload when compared to performing the workload using general purpose computing devices such as general purpose processors, memory, etc.

The determination may be made based on a type of the workload, information included in the workload placement request, etc. For example, the special purpose hardware requirement may be explicitly specified in the workload placement request, the type of the workload specified by the workload placement request may be used to identify the special purpose hardware requirement (e.g., inferred), and/or via another method without departing from the invention.

If it is determined that the workload has a special purpose hardware requirement, then the method may proceed to step 306. Otherwise, the method may proceed to step 310.

In step 306, a placement location based on the relevant performance metrics and/or the special purpose hardware requirement is identified. The placement location may include any quantity of on-demand and/or dedicated infrastructure.

The placement location may be determined by first filtering all possible placement locations based on the special purpose hardware requirement to find a subset of possible placement locations. Once filtered, the relevant performance metrics for each of the placement locations in the subset of possible locations may be evaluated.

The evaluation may include generation of a score for each of the aforementioned placement locations based on the relevant performance metrics. For example, the performance metrics may provide a score for a corresponding placement location of the subset of placement locations. The score may be normalized (e.g., to a 100 point scale) or may be unnormalized.

The placement locations of the subset of placement locations may then be ordered from most desirable to least desirable based on the scores. If the most desirable placement location is able to meet workload performance requirements for the workload (e.g., maximum allowable duration of time for performing the workload), then the most desirable location may be identified as the placement location. If the most desirable location is unable to meet the workload performance requirements for the workload, then the workload may be scaled out across multiple placement locations by, for example, distributing the workload to be performed across the multiple placement locations. When doing so, the workload manager may take into account scale-out metrics to estimate the reduction in efficiency of performing the workload.

In step 308, a workload instance for the workload placement request is placed based on the placement location. Placing the workload may cause the workload to be performed at the placement location.

In one or more embodiments of the invention, the workload instance is placed by, for example, making a call or otherwise requesting that a manager of the infrastructure at the placement location perform the instance of the workload. In response, the manager of the infrastructure may, for example, transfer data relevant to performance of the workload to the placement location, may schedule performance of the workload at the placement location, etc. Alternatively, the workload manager may place the workload directly (e.g., by performing similar actions described above rather than by requesting the performance of such actions).

The method may end following step 308.

Returning to step 304, the method may proceed to step 310 following step 304 when it is determined that the workload does not have a special purpose hardware requirement.

In step 310, a placement location for the workload is identified based on the relevant performance metrics. The placement location may be identified similarly to that described with respect to step 306, however, the potential placement locations may not be limited to the subset discussed with respect to step 306.

The method may proceed to step 308 following step 310.

Using the method illustrated in FIG. 3, a workload may be placed across any quantity of on-demand and dedicated infrastructure in a manner that efficiently marshals limited computing resources for performance of the workload. For example, the method of FIG. 3 may take into account how special purpose hardware may be used to improve the efficiency of workload performance.

Turning to FIG. 4, FIG. 4 shows a flowchart of a method in accordance with one or more embodiments of the invention. The method depicted in FIG. 4 may be performed to respond to performance metric change events in accordance with one or more embodiments of the invention. The method shown in FIG. 4 may be performed by, for example, an infrastructure manager (e.g., 110, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a performance metric change event is identified. The performance metric change event may be identified by monitoring (i) the infrastructure that is available for performance of workloads (e.g., identifying when infrastructure completes workloads and/or when new infrastructure is added), (ii) the performance of new test workloads and/or other methods of generating metrics usable to estimate the future performance of various types of workloads, and/or (iii) the availability of new externally available metrics such as benchmarks, publicly available performance tests, etc. Such information may be recorded in the available infrastructure repository (224, FIG. 2.2) and/or performance metrics repository (222, FIG. 2.3).

In step 402, at least one placed workload impacted by the performance metric change event is identified. The at least one placed workload impacted by the performance metric change event may be identified by matching special purpose hardware requirements or other characteristics of the at least one placed workloads to a placement location that has become available due to the performance metric change event.

For example, if a performance metric change event allows for a placement location that has a special purpose hardware device, then the placement location associated with the now-available special purpose hardware device may be marked as available. In response, one or more workloads (e.g., workloads that are being performed) that could be performed more efficiently using the special purpose hardware device may be identified (e.g., workloads being performed at placement locations that do not include the special purpose hardware device).

In another example, if a performance metric change event allows for a placement location that has a larger quantity of available processing resources than other placement locations at which workloads have been scaled out due to the lack of placement locations having larger quantities of available processing resources, then the placement location associated with the now-available larger quantity of processing resources (e.g., processors) may be marked as available. In response, the one or more workloads (e.g., workloads that are being performed) that could be performed more efficiently using the larger quantity of processing resources may be identified (e.g., workloads being performed across multiple placement locations that are subject to less efficient performance due to being scaled-out).

In step 404, a new workload placement location for the at least one placed workload is identified. The new workload placement location may be identified by, for example, performing the actions described with respect to step 306 of FIG. 3. The new workload location may be the same location where the workload is currently placed (e.g., in a scenario where the change in performance metrics did not provide for an improved placement location) or may be a different location.

In step 406, it is determined whether a current placement location of the placed workload is different from the new workload placement location. If it is determined that the current placement location is different from the new workload placement location (e.g., when a change in placement of the workload may cause it to be performed more efficiently or an otherwise more desirable manner), then the method may proceed to step 408. Otherwise, the method may end following step 406.

In step 408, placement of the at least one placed workload is updated based on the new workload placement location.

In one or more embodiments of the invention, the placement is updated by migrating the at least one placed workload to the new workload placement location. The workload may be migrated by, for example, making a call to an infrastructure management entity. In response, the infrastructure management entity may, for example, copy data necessary to perform the workload to the new workload placement location and/or schedule performance of the workload (e.g., reserve computation/storage/memory resources).

The method may end following step 408.

Using the method illustrated in FIG. 4, workload placement locations may be reevaluated as changes in resource availabilities and/or metrics usable to estimate how placement locations will impact performance if the workloads are added, removed, and/or otherwise change during performance of the workloads. Consequently, workloads may be migrated, during workload performance, to better marshal limited computing resources for performance of the workloads.

Turning to FIG. 5.1, FIG. 5.1 shows a flowchart of a method in accordance with one or more embodiments of the invention. The method depicted in FIG. 5.1 may be performed to manage an available infrastructure repository in accordance with one or more embodiments of the invention. The method shown in FIG. 5.1 may be performed by, for example, an infrastructure manager (e.g., 110, FIG. 1). Other components of the system in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, infrastructure that may be allocated to perform a workload is identified. The infrastructure may include any quantity and/or type of on-demand and/or dedicated infrastructure. The identified infrastructure may be, for example, newly available infrastructure (e.g., infrastructure that may be allocated for workload performance purposes) made newly available via any mechanism (e.g., added hardware, existing hardware made allocable by the infrastructure manager, etc.).

In step 502, a characterization of the infrastructure is performed. The characterization may specify any number of characteristics of the infrastructure that may allow the infrastructure to perform particular workloads more efficiently. For example, the characterization may specify: (i) a number and type of special purpose hardware devices hosted by the infrastructure, (ii) an interconnection modality between the special purpose hardware device and general purpose devices (e.g., processors, memory, storage, etc.), (iii) versions of the special purpose hardware devices and/or firmware used to manage the operation of the special purpose hardware devices, and/or (iv) other types of information usable to identify whether the infrastructure may be able to efficiently perform particular workloads.

In one or more embodiments of the invention, the characterization is performed via the method illustrated in FIG. 5.2. The characterization may be performed via other methods without departing from the invention.

In step 504, a special purpose hardware profile for the infrastructure is obtained. The special purpose hardware profile may indicate the capacity of the infrastructure to perform special purpose hardware enabled workloads.

The special purpose hardware profile may be an aggregation of the information obtained during the characterization of the infrastructure discussed with respect to step 502. The special purpose hardware profile may specify, for example, a rate at which computations or other actions may be performed using the special purpose hardware hosted by the infrastructure. The special purpose hardware profile may also specify, for example, the types of workloads that may be performed using the special purpose hardware profile. For example, the special purpose hardware profile may be similar to that described with respect to FIG. 2.2.

In step 506, an available infrastructure repository is updated based on the special purpose hardware profile. For example, the information included in the special purpose hardware profile may be used to update the available infrastructure repository. Consequently, the updated available infrastructure repository may better reflect the capabilities of the infrastructure available to perform workloads.

The method may end following step 506.

Using the method illustrated in FIG. 5.1, a system similar to that illustrated in FIG. 1 may make better workload placement decisions as new infrastructure becomes available for placement. Specifically, by characterizing infrastructure as it becomes available for workload placement, better placement decisions may be made when future workloads that may be efficiently performed using special purpose hardware devices request placement.

Turning to FIG. 5.2, FIG. 5.2 shows a flowchart of a method in accordance with one or more embodiments of the invention. The method depicted in FIG. 5.2 may be performed to manage an available infrastructure repository in accordance with one or more embodiments of the invention. The method shown in FIG. 5.2 may be performed by, for example, an infrastructure manager (e.g., 110, FIG. 1). Other components of the system in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a component load of the infrastructure is identified based on a schema. The schema may be a data structure that specifies which hardware components of infrastructure are to be identified. In one or more embodiments of the invention, the schema specifies characteristics (e.g., quantity, type, version, etc.) of special purpose hardware devices. The schema may be provided to the infrastructure to perform a self-inventory using the schema or may be used to program an agent or other entities hosted by the infrastructure to perform the inventory.

The component load may include information regarding the general purpose and/or special purpose hardware and/or software components of the infrastructure. The component load may be a data structure (e.g., a list, table, etc.) that reflects this information.

In step 512, an interconnection topology of the hardware components of the infrastructure is identified based on the schema. The interconnection topology may reflect the bridges, buses, and/or other types of connections that allow the hardware components to communicate with other hardware devices and that may limit such communications. The identified interconnection topology may specify, for example, the communications bandwidth, latency, and/or other characteristics of the connectivity between the hardware components (e.g., general purpose and/or special purpose hardware devices).

In step 514, operation conditions of the hardware components of the infrastructure are identified based on the schema. The operation conditions may reflect, for example, (i) the software used to manage operation of the hardware components and (ii) a duration of use of the hardware components versus a useful life of the hardware components.

The information collected in steps 510-514 may be used in step 504 of FIG. 5.1 to obtain the special purpose hardware profile. For example, the collected information may be arranged, filtered, and/or otherwise modified and integrated into the special purpose hardware profile.

To obtain the information collected in steps 510-514, the infrastructure manager may, for example, send a request (e.g., network communication) for the information to the infrastructure, instantiate an agent in the infrastructure that obtains the information, and/or via other methods.

The method may end following step 514.

Using the method illustrated in FIG. 5.2, characteristics of the infrastructure that may make it perform certain workloads much more efficiently may be obtained. By obtaining this information, rather than generalized information such as available processing cycles, memory, etc., the infrastructure manager may make workload placement decisions that more efficiently marshal limited computing resources for workload performance.

To further clarify embodiments of the invention, non-limiting examples are provided in FIGS. 6.1-7.4. These figures show diagrams of an example of a system similar to that of FIG. 1 over time.

First Example

Consider a scenario as illustrated in FIG. 6.1 in which an infrastructure manager (600) is tasked with placing workloads across a combination of dedicated infrastructure (620) and on-demand infrastructure (630). To make workload placement decisions, the infrastructure manager (600) takes into account the characteristics of different portions of the infrastructure.

For example, as seen in FIG. 6.1, a newly added node (640) has been added to the on-demand infrastructure (630). The infrastructure manager (600) is unaware of the characteristics of this newly added node (640). In particular, the infrastructure manager (600) is unaware that the newly added node (640) hosts an accelerator (642) usable to efficiently perform certain types of workloads.

To make better workload placement decisions, at step 1, the infrastructure manager (600) sends a communication to the newly added node (640) instructing the newly added node (640) to instantiate an agent for the infrastructure manager (600).

In response to this communication, the newly added node (640) instantiates an agent (644) as seen in FIG. 6.2. The agent (644) is programmed to generate a special purpose hardware profile for the newly added node (640). To do so, the agent (644) inventories the newly added node (640) thereby discovering the accelerator (642).

Once inventoried, at step 3, the agent (644) sends a communication to the infrastructure manager (600) that specifies that the newly added node (640) hosts the accelerator (642). In response, at step 4, the infrastructure manager (600) updates its available infrastructure repository by adding an entry corresponding to the newly added node (640). The entry includes a special purpose hardware profile that specifies that the accelerator (642) is hosted by the newly added node (640).

Turning to FIG. 6.3, after the infrastructure manager (600) updates its available infrastructure repository, the infrastructure manager (600) receives a workload placement request for a workload. In response, the infrastructure manager (600) identifies that the workload has a special purpose hardware requirement that matches the accelerator (642). Based on this match and the availability of the newly added node (640) to perform workloads, the infrastructure manager (600) selects the newly added node (640) to perform the workload over an existing node (650) of the on-demand infrastructure (630) and the dedicated infrastructure (620). The infrastructure manager (600) does so because the accelerator (642) is able to perform the workload much more efficiently than these other potential placement locations.

Based on the determination, at step 5, the infrastructure manager (600) sends a communication to the newly added node (640) instructing it to perform the workload. In response, at step 6, the newly added node (640) begins to perform the workload (646) using the accelerator (642) and other computing resources it hosts.

End of First Example

Second Example

Consider a second scenario as illustrated in FIG. 7.1 in which the on-demand infrastructure (630) of the first scenario hosts a first node (660) having an accelerator (642) and a second node (670) that does not have an accelerator. The accelerator (642) enables the first node (660) to perform workloads much more efficiently.

Due to the limited computational resources available to the first node (660), the infrastructure manager (600) elected to place a first workload (662) that could benefit from the accelerator (642) in the first node (660) and a second workload (672) that could also benefit from the accelerator (642) (were it not going to be used to perform the first workload (662)) in the second node (670). Consequently, the first workload (662) is being performed much more quickly and efficiently than the second workload (672) in FIG. 7.2.

Turning to FIG. 7.2, the first node (660) completes the first workload. In response, at step 10, it sends a communication to the infrastructure manager (600) indicating that it has completed the first workload.

In response to the communication, at step 11, the infrastructure manager (600) updates its available infrastructure repository to indicate that the first node (660) is available for workload placement. The infrastructure manager (600) interprets this change as a performance metrics change event.

Turning to FIG. 7.3, in response to the performance metrics change event, the infrastructure manager (600) reevaluates the placement of the second workload (672) and determines that the second workload (672) would be more efficiently performed by the first node (660). For example, the infrastructure manager (600) may evaluate a number of generated performance profiles and externally obtained performance profiles to rank the dedicated infrastructure (620), the first node (660), and the second node (670) with respect to one another. In this second scenario, the first node (660) is ranked the best by virtue of the presence of the accelerator (642).

In response, at step 12, the infrastructure (600) sends a communication to the second node (670) instructing the second node to suspend the second workload and migrate the second workload to the first node (660). The second node (670), at step 13, suspends the second workload (672) in response to the communication.

Turning to FIG. 7.4, once the second workload is suspended, the second node (670), at step 14, sends a copy of the second workload to the first node (660) and a communication instructing the first node (660) to perform the second workload.

In response to the communication, at step 15, the first node (660) instantiates a new instance of the second workload (664) using the copy of the second workload and begins to perform the second workload. By virtue of the presence of the accelerator (642), the first node (660) is able to complete the second workload much more quickly than the second node (670) even with the added overhead of migrating the second workload.

End of Second Example

As seen in the above examples, by granularly characterizing the capabilities of the various portions of infrastructure that may be able to perform workloads and ranking these portions of infrastructure using a combination of both public and private performance metrics, the infrastructure manager (600) may be capable of efficiently marshaling limited computing resources to complete workloads across a hybrid dedicated and on-demand computing environment.

Figure 8:
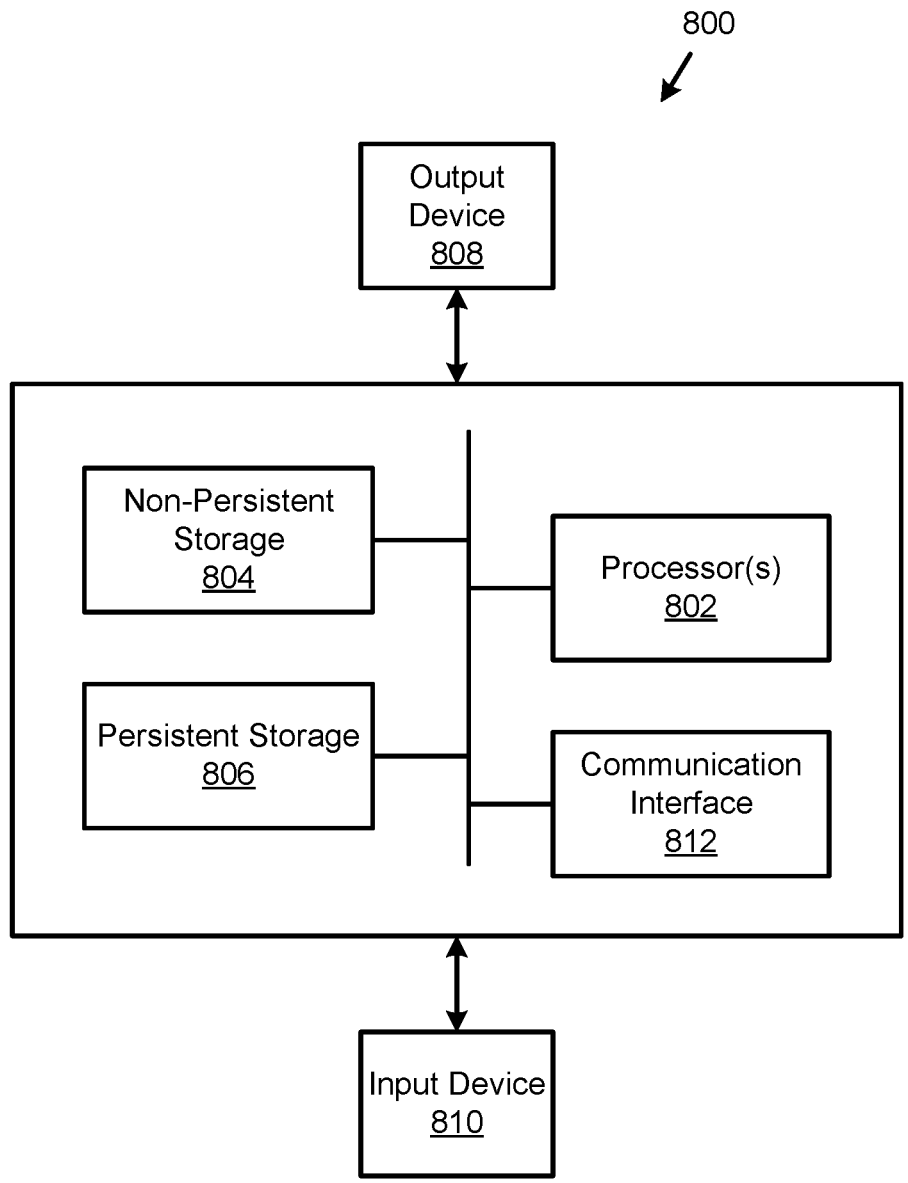
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for providing workload management services. Specifically, embodiments of the invention may provide methods for more improving the efficiency of workload placement in dynamic computing environment. To do so, the system may granularly characterize the computing capacities of various workload placement locations and use a combination of both publicly available and privately ascribed performance metrics for these workload placement locations. By doing so, the system may automatically respond to changes in the computing environment in a manner that more efficiently marshals limited computing resources for performance of workloads.

Thus, embodiments of the invention may address the problem of limited computing resources for workload performance. By improving the placement of workloads within dynamic computing environments, these limited computing resources may be better marshaled to improve the efficiency of workload performance.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An infrastructure manager for placing workloads for performance across available infrastructure comprising a plurality of on-demand infrastructure and a plurality of dedicated infrastructure, comprising:

a storage device for storing an available infrastructure repository specifying at least types, quantities, and characteristics of different portions of the available infrastructure for placing the workloads; and a processor programmed to:

intercept a workload placement request for a workload of the workloads, wherein the request specifies at least one selected from a group consisting of a type of the workload, resources required to perform the workload, and a prioritization parameter for performance of the workload, wherein the request is issued by a client;

identify performance metrics by matching the type of the workload to performance profiles associated with the workloads, wherein the performance metrics are used to estimate how efficient the workload will be performed using a combination of the plurality of on-demand infrastructure and the plurality of dedicated infrastructure;

make, based on the request, a determination that the workload has a special purpose hardware requirement;

in response to the determination:

identify, based on the performance metrics and the special purpose hardware requirement, a plurality of potential placement locations (PLs) in the available infrastructure for the workload that each meet the special purpose hardware requirement;

place, based on information obtained from a performance metrics repository, the workload at a first PL of the plurality of the potential PLs, wherein the information comprises at least a first result specifying a first performance of a test workload using the dedicated infrastructure and a second result specifying a second performance of the test workload using the on-demand infrastructure;

identify, after placing the workload and while the workload is being performed, a performance metric change in the available infrastructure, wherein the workload is impacted by the performance metric change;

identify, based on the performance metric change and the special purpose hardware requirement, a second PL of the plurality of potential PLs is now available to perform the workload in a more efficient manner than the first PL, wherein the second PL is different from the first PL or the second PL is not different from the first PL;

make a second determination that the second PL is different from the first PL; and migrate, based on the second determination, the workload to the second PL.

2. The infrastructure manager of claim 1, wherein the available infrastructure repository specifies special purpose hardware profiles for the available infrastructure.

3. The infrastructure manager of claim 2, wherein the special purpose hardware profiles specify special purpose hardware devices by the respective available infrastructure.

4. The infrastructure manager of claim 3, wherein the special purpose hardware devices are adapted to perform a portion of the workloads in a more efficient manner than general purpose computational devices.

5. The infrastructure manager of claim 4, wherein the special purpose hardware profiles further specify interconnectivity between the special purpose hardware devices and the general purpose computation devices.

6. The infrastructure manager of claim 4, wherein the special purpose hardware profiles further specify identifiers of software components that orchestrate operation of the respective special purpose hardware devices.

7. The infrastructure manager of claim 6, wherein the software components are firmware hosted by the respective special purpose hardware devices.

8. The infrastructure manager of claim 1, wherein the determination is based on the type of the workload.

9. The infrastructure manager of claim 1, wherein the determination is based on a requirement specified in the workload placement request.

10. The infrastructure manager of claim 1, wherein the special purpose hardware requirement is presence of a hardware device that is able to perform the workload more efficiently than general purpose computing devices.

11. A method for placing workloads for placing workloads for performance across available infrastructure comprising a plurality of on-demand infrastructure and a plurality of dedicated infrastructure, comprising:

intercepting a workload placement request for a workload of the workloads, wherein the request specifies at least one selected from a group consisting of a type of the workload, resources required to perform the workload, and a prioritization parameter for performance of the workload, wherein the request is issued by a client;

identifying performance metrics by matching the type of the workload to performance profiles associated with the workloads, wherein the performance metrics are used to estimate how efficient the workload will be performed using a combination of the plurality of on-demand infrastructure and the plurality of dedicated infrastructure;

making, based on the request, a determination that the workload has a special purpose hardware requirement;

in response to the determination:

identifying, based on the performance metrics and the special purpose hardware requirement, a plurality of potential placement locations (PLs) in the available infrastructure for the workload that each meet the special purpose hardware requirement, wherein an available infrastructure repository specifies at least types, quantities, and characteristics of different portions of the available infrastructure for placing the workloads;

placing, based on information obtained from a performance metrics repository, the workload at a first PL of the plurality of the potential PLs, wherein the information comprises at least a first result specifying a first performance of a test workload using the dedicated infrastructure and a second result specifying a second performance of the test workload using the on-demand infrastructure;

identifying, after placing the workload and while the workload is being performed, a performance metric change in the available infrastructure, wherein the workload is impacted by the performance metric change;

identifying, based on the performance metric change and the special purpose hardware requirement, a second PL of the plurality of potential PLs is now available to perform the workload in a more efficient manner than the first PL, wherein the second PL is different from the first PL or the second PL is not different from the first PL;

making a second determination that the second PL is different from the first PL; and migrating, based on the second determination, the workload to the second PL.

12. The method of claim 11, wherein the available infrastructure repository specifies special purpose hardware profiles for the available infrastructure.

13. The method of claim 12, wherein the special purpose hardware profiles specify special purpose hardware devices by the respective available infrastructure.

14. The method of claim 13, wherein the special purpose hardware devices are adapted to perform a portion of the workloads in a more efficient manner than general purpose computational devices.

15. The method of claim 14, wherein the special purpose hardware profiles further specify interconnectivity between the special purpose hardware devices and the general purpose computation devices.

16. A non-transitory computer readable medium comprising computer readable program code, which when executed by a computer processor enables the computer processor to perform a method for placing workloads for performance across available infrastructure comprising a plurality of on-demand infrastructure and a plurality of dedicated infrastructure, the method comprising:

intercepting a workload placement request for a workload of the workloads, wherein the request specifies at least one selected from a group consisting of a type of the workload, resources required to perform the workload, and a prioritization parameter for performance of the workload, wherein the request is issued by a client;

identifying performance metrics by matching the type of the workload to performance profiles associated with the workloads, wherein the performance metrics are used to estimate how efficient the workload will be performed using a combination of the plurality of on-demand infrastructure and the plurality of dedicated infrastructure;

making, based on the request, a determination that the workload has a special purpose hardware requirement;

in response to the determination:

identifying, based on the performance metrics and the special purpose hardware requirement, a plurality of potential placement locations (PLs) in the available infrastructure for the workload that each meet the special purpose hardware requirement, wherein an available infrastructure repository specifies at least types, quantities, and characteristics of different portions of the available infrastructure for placing the workloads;

placing, based on information obtained from a performance metrics repository, the workload at a first PL of the plurality of the potential PLs, wherein the information comprises at least a first result specifying a first performance of a test workload using the dedicated infrastructure and a second result specifying a second performance of the test workload using the on-demand infrastructure;

identifying, after placing the workload and while the workload is being performed, a performance metric change in the available infrastructure, wherein the workload is impacted by the performance metric change;

identifying, based on the performance metric change and the special purpose hardware requirement, a second PL of the plurality of potential PLs is now available to perform the workload in a more efficient manner than the first PL, wherein the second PL is different from the first PL or the second PL is not different from the first PL;

making a second determination that the second PL is different from the first PL; and migrating, based on the second determination, the workload to the second PL.

17. The non-transitory computer readable medium of claim 16, wherein the available infrastructure repository specifies special purpose hardware profiles for the available infrastructure.

18. The non-transitory computer readable medium of claim 17, wherein the special purpose hardware profiles specify special purpose hardware devices by the respective available infrastructure.

19. The non-transitory computer readable medium of claim 18, wherein the special purpose hardware devices are adapted to perform a portion of the workloads in a more efficient manner than general purpose computational devices.

20. The non-transitory computer readable medium of claim 19, wherein the special purpose hardware profiles further specify interconnectivity between the special purpose hardware devices and the general purpose computation devices.

* * * * *